(12) United States Patent
Galletti et al.

(10) Patent No.: US 10,923,246 B2
(45) Date of Patent: Feb. 16, 2021

(54) FLAME RETARDANT ELECTRICAL CABLE

(71) Applicants: Prysmian S.p.A., Milan (IT); Politecnico di Milano, Milan (IT)

(72) Inventors: Franco Galletti, Casatenovo (IT); Elena Roda, Segrate (IT); Giuseppe Merigo, Milan (IT)

(73) Assignees: PRYSMIAN S.P.A., Milan (IT); POLITECNICO DI MILANO, Milan (IT)

( * ) Notice: Subject to any disclaimer, the term of this patent is extended or adjusted under 35 U.S.C. 154(b) by 0 days.

(21) Appl. No.: 16/823,430

(22) Filed: Mar. 19, 2020

(65) Prior Publication Data
US 2020/0303088 A1    Sep. 24, 2020

(30) Foreign Application Priority Data
Mar. 21, 2019    (IT) ............... 102019000004127

(51) Int. Cl.
*H01B 7/02*    (2006.01)
*C08L 23/06*    (2006.01)
(Continued)

(52) U.S. Cl.
CPC ............. *H01B 7/02* (2013.01); *C08L 23/06* (2013.01); *C08L 23/12* (2013.01); *C08L 23/20* (2013.01);
(Continued)

(58) Field of Classification Search
CPC ... H01B 7/02; H01B 7/04; H01B 7/06; H01B 7/08; H01B 7/12; H01B 3/307;
(Continued)

(56) References Cited

U.S. PATENT DOCUMENTS 6,750,282 B1    6/2004    Schall et al.
2002/0001715 A1    1/2002    Redondo et al.
(Continued)

FOREIGN PATENT DOCUMENTS

CN        102219948 A        10/2011
WO    WO-2009010812 A1 *    1/2009    ............. C09K 21/04
(Continued)

OTHER PUBLICATIONS

Mehdaoui, Imed; Search Report issued in Italian Patent Application No. 201900004127; completed on Aug. 29, 2019; 2 pages.

*Primary Examiner* — William H. Mayo, III
(74) *Attorney, Agent, or Firm* — Ulmer & Berne LLP

(57) ABSTRACT

A flame-retardant electric cable has a core including an electric conductor and an electrically insulating layer. The electrically insulating layer includes a flame-retardant polyolefin-based composition which includes, as base polymer, a mixture of at least two polyolefin homopolymers and/or copolymer wherein at least one is a low-density polyethylene copolymer having a density lower than 0.915 g/cm3. The flame-retardant polyolefin-based composition also includes calcinated kaolin in an amount greater than 3 phr, a metal hydroxide in an amount greater than 10 phr, and an alkyl or alkenyl alkoxy siloxane. The alkyl or alkenyl alkoxy siloxane is in an amount ratio of from 1:25 to 1:50 with respect to the sum of the amounts of calcinated kaolin and of the metal hydroxide.

13 Claims, 1 Drawing Sheet

(51) Int. Cl.
  *C08L 23/12* (2006.01)
  *C08L 23/20* (2006.01)
  *H01B 3/30* (2006.01)
  *C08K 3/22* (2006.01)
  *C08K 3/34* (2006.01)
  *C08K 5/5419* (2006.01)

(52) U.S. Cl.
  CPC ............... *H01B 3/307* (2013.01); *C08K 3/22* (2013.01); *C08K 3/346* (2013.01); *C08K 5/5419* (2013.01); *C08L 2201/02* (2013.01); *C08L 2203/202* (2013.01); *C08L 2207/062* (2013.01); *C08L 2207/066* (2013.01)

(58) Field of Classification Search
  CPC ........ C08K 23/06; C08K 23/12; C08K 23/20; C08K 3/22; C08K 3/307; C08K 3/346; C08K 5/5419; C08K 2201/02; C08K 2203/202; C08K 2207/062; C08K 2207/066
  USPC .............................. 174/110 R, 120 R–122 SR
  See application file for complete search history.

(56) References Cited

U.S. PATENT DOCUMENTS

| | | |
|---|---|---|
| 2003/0134969 A1 | 7/2003 | Schlosser et al. |
| 2010/0160523 A1* | 6/2010 | Zucchelli ................. C08K 9/02 524/414 |
| 2012/0238664 A1* | 9/2012 | Yan ......................... C08L 75/04 523/179 |
| 2014/0030520 A1 | 1/2014 | Nakamura et al. |
| 2014/0303294 A1* | 10/2014 | Zucchelli ............. C08K 5/3432 524/100 |
| 2015/0299542 A1* | 10/2015 | Determan ................ C08L 9/02 442/123 |
| 2015/0376368 A1* | 12/2015 | Zucchelli ............ C08L 23/0815 524/269 |

FOREIGN PATENT DOCUMENTS

| | | | | |
|---|---|---|---|---|
| WO | WO-2011069301 A1 * | 6/2011 | ........ | C08L 23/0853 |
| WO | WO-2012168746 A1 * | 12/2012 | ........ | C08K 5/02 |
| WO | 2013030795 A1 | 3/2013 | | |

* cited by examiner

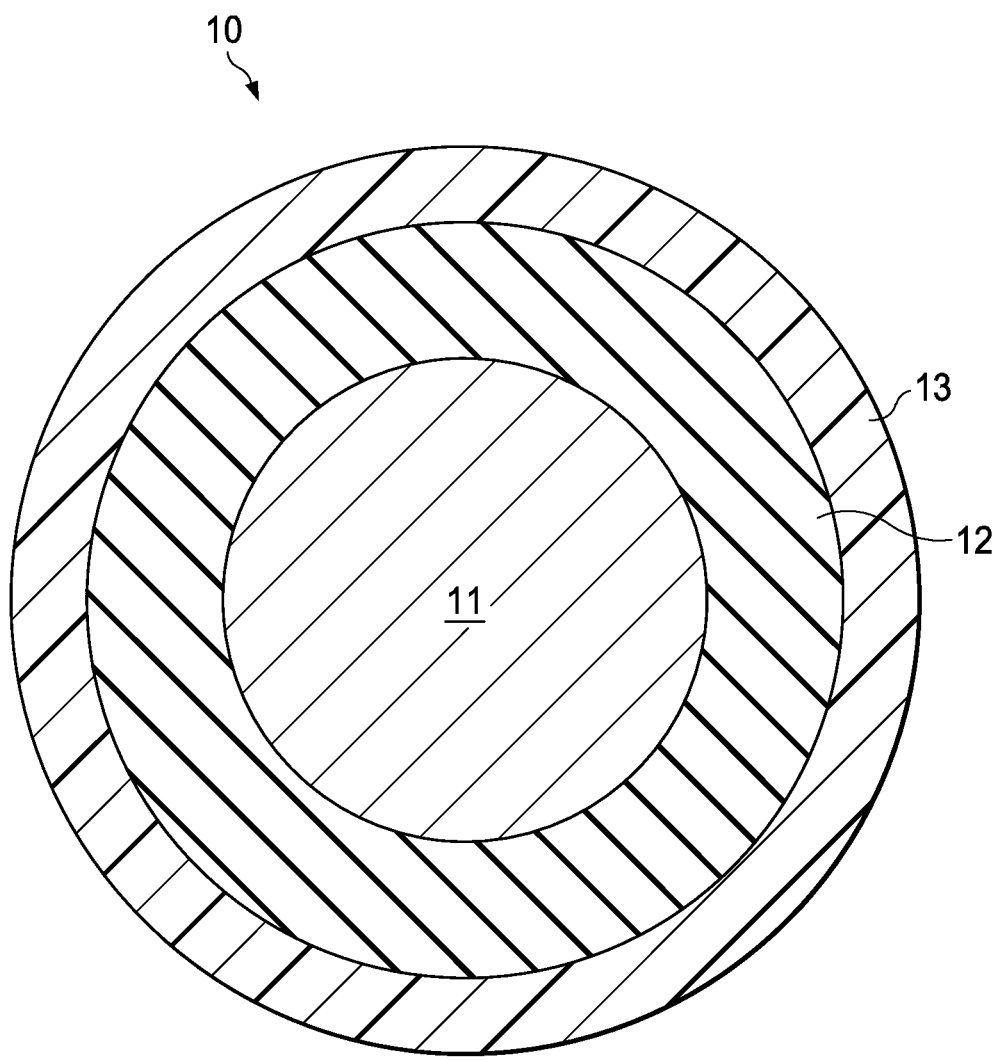

FLAME RETARDANT ELECTRICAL CABLE

FIELD OF APPLICATION

The present disclosure relates to a flame-retardant electrical cable.

In particular, the present disclosure relates to a flame-retardant, low-smoke and zero-halogen (LS0H) electrical cable which exhibits reduced dripping (occurrence of droplets) when exposed to high temperatures, e.g. in case of fire.

The cable according to the disclosure can be used particularly for low-voltage (LV) applications.

PRIOR ART

As known, an important requirement for electric cables is a suitable behaviour in case of fire (as specified for example in the standard IEC 60332-3C), so as to avoid flame propagation and smoke generation in houses or, more generally, in premises where persons reside. The general performances in case of fire are mainly assured by the outer part of the cable, mainly the electric insulating layer or the cable coating sheath which should have certain properties.

In this connection, it is known to produce the electrically insulating layer from a polymeric composition provided with fire resistance and/or flame-retardant properties by the addition of suitable fillers. In particular, the electric insulation of flame-retardant cables is currently preferably made of LS0H polyolefin-based compositions (e.g. polyethylene and/or polyethylene copolymers, optionally cross-linked) filled with inorganic hydroxides, such as magnesium hydroxide and/or aluminium hydroxide, which confer flame-retardant properties to the polyolefin.

In order to obtain a satisfactory flame-retardant effect, it is necessary to introduce substantial amounts of inorganic filler in the polymeric material. This addition can worsen the dielectric and mechanical properties of the polymeric material as well as its workability with particular reference to its extrudability.

The flame retardancy of an electric cable can be evaluated for compliance with and certified by national and/or international standards.

Some standard requirements are getting more and more stringent about the performances required to a flame-retardant cable to the end of improving the safety in buildings in case of fire.

US 2003/0134969 discloses a cable composition comprising a unsaturated organosilane supported on a carrier, a thermoplastic base polymer and a flame-retardant mineral filler. The amount of unsaturated organosilane is from 0.1% to 10% by weight based on the total weight of the composition and the thermoplastic polymer can be a linear polyethylene (PE) polymer, such as LDPE or LLDPE. Examples of suitable fillers are aluminum trihydroxide (ATH), magnesium dihydroxide (MDH), brucite, montmorillonite. What are known as "char formers" may also be used.

U.S. Pat. No. 6,750,282 describes a flameproof, essentially halogen-free polymer composition containing:
a) 100 parts by weight of a thermoplastic, crosslinkable or crosslinked elastomeric and/or thermosetting polymer;
b) 10 to 200 parts by weight of magnesium hydroxide or aluminium hydroxide and/or their double hydroxides;
c) 1 to 50 parts by weight of an organically intercalated layer silicate.

The amount of added flameproofing hydroxides (b) can be substantially reduced if organically intercalated layer silicates (c) are incorporated in the polymer mixtures.

CN 102219948 discloses a thermoplastic, low-smoke, flame retardant and halogen-free polyolefin cable material which is prepared from a composition containing:
40-55 parts by weight of aluminium hydroxide;
25-40 parts by weight of metallocene polyolefin elastomer;
5-10 parts by weight of low-density polyethylene;
5-10 parts of compatibilizer;
2-2.5 parts of silane coupling agent;
1.5-2.0 parts by weight of lubricant;
0.1-0.2 parts by weight of antioxidant.

SUMMARY OF THE DISCLOSURE

A main object of the present disclosure is providing a flame-retardant electric cable, in particular a flame-retardant electric cable for low-voltage applications, having improved reaction to fire performances and particularly reduced dripping (occurrence of droplets) or no dripping when exposed to flame temperatures, such as those involved in a fire.

In addition to having better reaction to fire performances, the sought flame-retardant electric cable should also show good mechanical properties and workability as well as should have an electrically insulating layer with suitable good dielectric properties.

The Applicant found that an electric cable has improved flame-retardant properties, particularly a reduced dripping under fire, when its conductor is coated with an electrically insulating layer made from a flame-retardant polyolefin-based composition comprising a polyolefin as base polymer and a balanced combination of calcinated kaolin and metal hydroxide as flame-retardant inorganic fillers and an alkyl or alkenyl alkoxy siloxane.

Accordingly, the present disclosure relates to a flame-retardant electric cable having a core comprising an electric conductor and an electrically insulating layer of a flame-retardant polyolefin-based composition comprising:
a) as base polymer, a mixture of at least two polyolefin homopolymers and/or copolymers wherein at least one is a low-density polyethylene copolymer having a density lower than 0.915 g/cm3;
b) calcinated kaolin in an amount greater than 3 phr;
c) a metal hydroxide in an amount greater than 10 phr; and
d) an alkyl or alkenyl alkoxy siloxane,
wherein the alkyl or alkenyl alkoxy siloxane is in an amount ratio of from 1:25 to 1:50 with respect to the sum of the amounts of calcinated kaolin and of the metal hydroxide.

The Applicant found that a cable provided with an electrically insulating layer made from a flame-retardant composition as specified above has improved reaction to fire, especially regarding a lower dripping or absence of dripping during burning. In addition, the Applicant found that the provision of an electrically insulating layer made from the flame-retardant polyolefin-based composition as specified above allows to impart improved performance under fire and/or flame-retardant properties to the cable without impairing its mechanical and dielectric properties as well as workability of the polymer material forming the electrically insulating layer, particularly through conventional extrusion techniques.

Furthermore, the cable provided with an electrically insulating layer made from a flame-retardant composition as specified above is a low-smoke, essentially halogen-free cable (LS0H).

DETAILED DESCRIPTION

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein. In addition, unless indicated otherwise, all percentages referred to components of the flame-retardant polyolefin-based composition used for obtaining the insulation coating of the cable according to the disclosure are to be understood as percentages by weight on the total weight of the composition.

As used in the specification and the appended claims, the singular forms "a," "an," and "the" include plural referents unless the context clearly dictates otherwise.

In the present description, it is to be understood that the technical features described specifically above and below can be combined with each other in any way, constituting further embodiments of the present disclosure which may not be specifically described for conciseness, but which fall within the scope of the present disclosure.

In the present description and in the appended claims, the term "phr" is used to indicate parts by weight per 100 parts by weight of the base polymeric material.

In the present description and in the appended claims, weight percent (wt %) is referred to the total weight of the flame-retardant polyolefin-based composition.

The cable according to the disclosure can be used particularly for low-voltage (LV) applications. In the present description and the appended claims, as low voltage (LV) cable it is meant a voltage equal to or less than about 1 kV.

The cable of the present disclosure is particularly suitable to transport and distribute electric current for energy and for telecommunication.

In FIG. 1, a cable 10 according to a non-limiting embodiment of the disclosure is shown. Cable 10 has a core comprising a conductor 11 which is an elongated element made of an electrically conductive material, e.g. aluminium, copper, carbon nanotubes or composite thereof. The conductor 11 may be in the form of a solid bar or a bundle of wires, preferably stranded.

In the cable of the disclosure, the core may include a single conductor or a plurality of conductors.

Each conductor (in the case of FIG. 1, the single conductor 11) of the cable of the disclosure is electrically insulated by an insulating layer 12 in form of an extruded polymeric coating according to the present disclosure. In the embodiment shown in FIG. 1, the insulating layer is extruded in direct contact with the conductor 11.

An outer jacket 13, made of extruded polymeric material such as polyethylene, may be provided to surround the electrically insulating layer 12 and in direct contact thereto.

According to the present disclosure, the cable electrically insulating layer is made from a flame-retardant polyolefin-based composition as described in claim 1.

Illustrative examples of polyolefin homopolymers and/or copolymer for the mixture as base polymer of the flame-retardant composition forming the electrically insulating layer of the cable include polyethylene; polypropylene; ethylene copolymers with C3 to C10 monomers such as ethylene-propylene copolymer or linear low-density polyethylene (LLDPE); polybutene, poly(4-methylpentene-1), or the like, copolymers of these olefins and dienes.

In an embodiment, the base polymer is selected from the group consisting of polyethylene and polyethylene-polypropylene copolymer. For example, the base polymer is polyethylene, like low-density polyethylene (LDPE) and linear low-density polyethylene (LLDPE).

The base polymer can optionally be cross-linked in a partial or complete manner. Crosslinking, where provided, can be carried out, for example, by a silane-based crosslinking agent, such as vinyl silane, and/or by a peroxide, such as dibutylperoxide.

The flame-retardant polyolefin-based composition comprises at least a low-density polyethylene copolymer having a density lower than 0.915 g/cm3. For example, the low-density polyethylene has a density ranging from 0.840 to 0.910 g/cm3.

In an embodiment, the flame-retardant polyolefin-based composition comprises an amount of low-density polyethylene copolymer greater than 2 wt % of the total weight of the composition. In an embodiment, the amount of low-density polyethylene copolymer is of at most 10 wt % of the total weight of the composition.

The low-density polyethylene copolymer can be an LLDPE selected from ethylene octene copolymer and ethylene butene copolymer.

In an embodiment, the low-density polyethylene copolymer is obtained by metallocene catalysis.

The low-density polyethylene copolymer allows to incorporate and disperse more easily the flame-retardant inorganic fillers (calcinated kaolin and metal hydroxide) in the polymer matrix of the composition.

The flame-retardant polyolefin-based composition comprises, as inorganic fillers which provide the polyolefin-based composition with flame retardancy characteristics, calcinated kaolin in an amount greater than 3 phr (greater than about 2.6 wt %) and a metal hydroxide in an amount greater than 10 phr (greater than about 8.8 wt %).

In an embodiment, the flame-retardant polyolefin-based composition comprises calcinated kaolin in an amount from 3.5 phr to 13 phr (3-8 wt %).

In an embodiment, the calcinated kaolin is silanized, i.e. it is subjected to a surface treatment of functionalization with a silane, such as for example vinyl silane, for improving the compatibility with the polymeric component and, accordingly, the homogeneity of the composition. Also, silanization decrease the polarity of kaolin, thus improving the electric performance of the insulating electrically polyolefin-based composition.

Calcinated kaolin can be obtained by subjecting natural kaolin, which normally contains crystallization water in its crystalline structure, to a high temperature heat treatment, for example at a temperature above 1000° C., a treatment known as calcination, to make it anhydrous. This involves a structure modification thereby obtaining a harder product with better electrical insulation properties.

The use of calcinated kaolin in the flame-retardant polyolefin-based composition can prevent and/or block the possible formation of electric percolation paths deriving from the presence of inorganic hydroxide fillers in the polymer matrix, thereby preserving the dielectric characteristics of the composition that are desired for use as an electrically insulating layer of the cable. At the same time, the calcinated kaolin being a component with flame-retardant properties also allows to reduce the amount of inorganic hydroxide fillers to be added to the polymer matrix for achieving the desired flame retardancy performances. In addition, the calcinated kaolin helps in maintaining good mechanical and workability characteristics of the polyolefin-based composition.

In the present description and claims, as "metal hydroxide" it is meant a hydroxide of a metal or a metal oxide in hydrated form.

In an embodiment, the flame-retardant polyolefin-based composition comprises a filler of at least one metal hydroxide in an amount from 10.5 phr to 45 phr (9-28 wt %).

For example, the metal hydroxide is selected from magnesium hydroxide, aluminium hydroxide or a combination thereof. The magnesium hydroxide can be either of synthetic (precipitated) and of natural origin (brucite).

The use of synthetic magnesium hydroxide in the flame-retardant polyolefin-based composition may improve the compatibility between metal hydroxide and the polymeric component of the composition.

The flame-retardant polyolefin-based composition comprises an alkyl or alkenyl alkoxy siloxane in an amount ratio of from 1:25 to 1:50 with respect to the sum of the amounts of calcinated kaolin and of the metal hydroxide.

The alkyl or alkenyl alkoxy siloxanes for use in the flame-retardant polyolefin-based composition for the cable insulating layer can have the following general formula I:

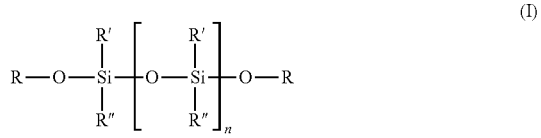

wherein

R is hydrogen or a straight or branched alkyl group having from 1 to 4 carbon atoms;

R' and R" are the same or different and are selected from a straight or branched alkyl or alkenyl group having from 5 to 20 carbon atoms; and n is an integer from 1 to 10,000.

In an embodiment, the alkoxy siloxanes of the present composition have a formula I wherein R is ethoxy and R' and R" are the same or different and selected from a straight or branched alkyl group having from 6 to 16 carbon atoms. An alkoxy siloxane suitable for the present cable Silmalink AQ 2345 marketed by Silma (Società Italiana Lavorazione Masterbatches ed Affini) S.r.l. (www.silmaster.com).

Without wishing to be bound to any theory, the Applicant perceived that the use of alkyl or alkenyl alkoxy siloxanes in the flame-retardant polyolefin-based composition for use as a cable electrically insulating layer can improve the compatibility between the metal hydroxide filler and the polymeric component of the composition by increasing the interactions between the hydroxyl groups of the filler and the polyolefin chains so as to improve the dispersion of the inorganic filler in the polymer matrix and. The use of alkyl or alkenyl alkoxy siloxanes also promotes the formation of cohesive carbon residues ("char") in the an electrically insulating layer when exposed to flames, for example in the event of a fire, thereby obtaining a reduction/absence of dripping of polymeric material forming such coating. Moreover, the use of the aforementioned siloxanes in the polymeric composition allows reducing the viscosity during extrusion thus improving the workability of the flame-retardant polyolefin-based composition.

The Applicant found that the presence of alkyl or alkenyl alkoxy siloxanes can play a significant role in improving the performances of the olefin-based composition under fire when the amount of such siloxanes in the electrically insulating layer of the cable is related according to a predetermined ratio to the amount of flame-retardant inorganic filler present in the polymer composition (calcinated kaolin and metal hydroxide).

The Applicant experimented that the combination of the aforementioned components of the polyolefin-based polymeric composition in the respective amount ranges indicated above endows the electrically insulating layer with improved reaction to fire, especially reduced dripping, such as to render the cable comprising this composition compliant with stringent requirements of standards (e.g. the Regulation CPR 2016/364 of the European Union) while maintaining good mechanical characteristics and workability in conventional extrusion processes.

Conversely, if only calcinated kaolin or metal hydroxide is used as flame-retardant inorganic filler of the composition, the resulting electrically insulating layer does not show significant reductions of the dripping in the event of fire. When both inorganic fillers (calcinated kaolin and metal hydroxide) are used without any alkyl or alkenyl alkoxy siloxane in the composition, no significant char formation is obtained on the resulting insulation coating.

The flame-retardant polyolefin-based composition may further comprise further conventional components such as antioxidants, process aids, lubricants, stabilizers, pigments, etc.

Conventional antioxidants which are suitable for this purpose are by way of example: polymerized trimethyldihydroquinoline, 4,4'-thiobis (3-methyl-6-tert-butyl) phenol, pentaerythritol tetrakis [3-(3,5-di-terz-butyl-4-hydroxyphenyl) propionate], 2,2'-thio-diethylene-bis-[3-(3,5-di-tert-butyl-4-hydroxy-phenyl) propionate] and the like or mixtures thereof.

Process aids usually added to the base polymer are, for example, calcium stearate, zinc stearate, stearic acid, paraffin wax, silicone rubbers, silicone oils and the like, and mixtures thereof.

The production of the cable according to the disclosure can be carried out by first preparing the flame-retardant polyolefin-based composition forming the electrically insulating layer by mixing the polymeric matrix and the additives using conventional techniques. For example, the mixing can be carried out in an internal mixer of the type with tangential rotors (Banbury) or with interpenetrating rotors, or alternatively in continuous mixers such as those of the Ko-Kneader type (Buss), or of the co-rotating or counter-rotating twin-screw type. The flame-retardant polyolefin-based composition can be used in a non-crosslinked form, to obtain an electrically insulating layer with thermoplastic properties and therefore recyclable.

The flame-retardant polyolefin-based composition, optionally cross-linked in partial or complete way, is extruded on the electrical conductor to obtain an electrically insulating layer, or on the electrical conductor previously coated with an electrically insulating layer to make an outer sheath. This step can be carried out using, for example, an extruder.

The cable according to the disclosure can be used particularly for the transport of electric energy or data. In one embodiment, the cable according to the disclosure is used for the transport of low voltage electric currents (LV), i.e. electric currents having a voltage not exceeding 1 kV.

The present disclosure will now be described with reference to the following examples which are provided for purpose of illustration only and thus are not to be construed as limiting the scope of the present disclosure in any way.

Example

Preparation of Test Samples According to the Disclosure, Reference and Comparative Samples A reference sample has been prepared with an electrically insulating layer made entirely of LLDPE. This sample is referred to as a sample A.

Furthermore, test sample according to the present disclosure and comparative samples (hereinafter referred to as samples from B to I) have been prepared from a flame-retardant polyolefin-based composition according to the disclosure and not according to the disclosure, respectively.

The steel mesh support used in each experiment was stored and visually assessed for the presence of carbon residues on it.

The mechanical properties of the cable samples were evaluated by measuring the following parameters and standards:

viscosity (ISO 289-1, 2014)

tensile strength, and elongation at break (IEC 60811-4-1, 2004).

The results of the tests are shown in the following Table I.

TABLE I

| Component | A* | B* | C* | D* | E* | F | H* |
|---|---|---|---|---|---|---|---|
| LLDPE (ethylene hexane copolymer) (0.920 g/cm$^3$) | 100 (100%) | 86 (75%) | 86 (75%) | 97 (85%) | 94 (75%) | 94 (75%) | 63 (25%) |
| LDPE (0.914 g/cm$^3$) | — | 4.2 (3.7%) | 4.2 (3.7%) | 1.0 (0.9%) | 1.8 (1.5%) | 1.8 (1.5%) | 11 (4.4%) |
| metallocene LLDPE (ethylene octene copolymer) (0.875 g/cm$^3$) | — | 10 (8.6%) | 10 (8.6%) | 2.3 (2.0%) | 4.3 (3.4%) | 4.3 (3.4%) | 26 (10%) |
| Calcinated kaolin | — | 14 (12%) | — | 3.0 (2.6%) | 6.1 (4.9%) | 6.1 (4.9%) | 37 (15%) |
| Precipitated magnesium hydroxide | — | — | 14 (12%) | 10 (8.8%) | 18 (15%) | 18 (15%) | 111 (44%) |
| Alkyl alkoxy siloxane | — | 0.35 (0.30%) | 0.35 (0.30%) | 0.30 (0.26%) | — | 0.70 (0.56%) | 3.7 (1.5%) |
| Viscosity (° Mooney) | — | — | — | — | 18.0 | 14.7 | 12.6 |
| Tensile strength (MPa) | 17.9 | 15.6 | 14.3 | 14.6 | 16.7 | 18.4 | 7.2 |
| Elongation at break (%) | 792 | 762 | 781 | 749 | 732 | 816 | 77 |
| % residue (drops) | 56 | 62 | 48 | 36 | 1.5 | 1 | — |

The flame-retardant polyolefin-based compositions of test samples from B to H were obtained by mixing, in Banbury, the ingredients set forth Table I.

In Table I the comparative samples and the reference sample A are marked with an asterisk.

The amounts are provided in phr (weight per 100 parts by weight of the base polymeric material) and, in brackets, in wt % (weight percent referred to the total weight of the composition).

The so-obtained samples were tested to determine their dripping behaviour under fire conditions and for mechanical properties.

The dripping tests were aimed at detecting the amount of dripping of the electrically insulating layers of the cables and the possible formation of cohesive carbon residues (chars) on them under fire conditions.

Four specimens having dimensions 50×75×3 mm were prepared for each test sample. Each specimen was weighed, placed on a 16 NIT (meshes counted in 50 mm) steel mesh support and burned under the action of a flame produced by a bunsen fed with air at a flow rate of 8 ml/min and with liquid propane gas (LPG) at a flow rate of 0.5 ml/min. The flame had a height of 13 cm and a blue dart of 5 cm and was directed towards the centre of each specimen at an angle of about 45°. The flame was held in this position for all the time of the experiment, i.e. until the sample under test was completely burned.

The dripped material (drops) from each test specimen was collected in a water-containing tank and then recovered from the tank using a 35 NIT filter. The residue on the filter was dried in an oven at 40° C. for 15 minutes and under light vacuum (900 mbar) and then weighed to calculate the percentage with respect to the initial weight using the following formula:

% residue=(drops weight/initial weight)×100.

From the above results, it can be observed that the reference sample A has good mechanical properties but, as expected, a high dripping under fire conditions due to the absence of flame-retardant fillers in the polymer matrix.

The presence of calcined kaolin, as the sole flame-retardant filler, and of alkylalkoxy siloxane (comparative cable B) results in a polyolefin polymer composition which has an increased dripping under fire conditions (+13% compared to the reference sample A).

The presence of magnesium hydroxide, as the sole flame-retardant filler, and of alkyl alkoxy siloxane (comparative sample C) results in a polyolefin polymer composition which has only a slight reduction of dripping under fire conditions (−14% compared to the reference sample A).

The presence of calcinated kaolin and magnesium hydroxide as flame-retardant fillers in amounts lower than those provided by the present disclosure, even in the presence of alkyl alkoxy siloxane (comparative sample D) results in a polyolefin-based composition having drip properties unsatisfactory, comparable to those of the aforementioned comparative samples B and C.

Vice versa, a too large amount of inorganic flame-retardant fillers impairs the mechanical properties, as from the test results obtained on sample H.

Comparative sample E has a composition differing from that of the present disclosure (in particular, from that of sample G) just in the absence of alkyl alkoxy siloxane. While the dripping behaviour is valuable, the mechanical features are worsened not only with respect to sample G, but also with respect to the reference sample A.

Surprisingly, the presence of calcinated kaolin and magnesium hydroxide as flame-retardant fillers, and siloxane in the amounts provided by the present disclosure (sample F) results in a flame-retardant polyolefin-based composition which has a remarkably low dripping (97% reduction compared to the reference cable A), thereby making a cable compliant with the requirements of international standards for reaction to fire. As it can be noted, the composition maintains good mechanical properties and workability in conventional extrusion processes.

Moreover, from the above tests, the presence of considerable amounts of carbon residues (char) on the net support used for the specimens of the test cables according to the disclosure was observed, an amount that was considerably greater than that of the carbon residues released by the tested comparative cables and the reference cable.

The invention claimed is:

1. A flame-retardant electric cable having a core comprising an electric conductor and an electrically insulating layer comprising a flame-retardant polyolefin-based composition comprising:
    a) as base polymer, a mixture of at least two polyolefin homopolymers and/or copolymer wherein at least one is a low-density polyethylene copolymer having a density lower than 0.915 g/cm$^3$;
    b) calcinated kaolin in an amount greater than 3 phr;
    c) a metal hydroxide in an amount greater than 10 phr; and
    d) an alkyl or alkenyl alkoxy siloxane,
        wherein the alkyl or alkenyl alkoxy siloxane is in an amount ratio of from 1:25 to 1:50 with respect to the sum of the amounts of calcinated kaolin and of the metal hydroxide.

2. The flame-retardant electric cable according to claim 1, wherein the mixture of at least two polyolefin homopolymers and/or copolymer comprises polyethylene; polypropylene; ethylene copolymers with C3 to C10 monomers; polybutene; poly(4-methylpentene-1), or copolymers of these olefins and dienes.

3. The flame-retardant electric cable according to claim 2, wherein the mixture of at least two polyolefin homopolymers and/or copolymer comprises low-density polyethylene (LDPE) and linear low-density polyethylene (LLDPE).

4. The flame-retardant electric cable according to claim 3, wherein the low-density polyethylene copolymer is obtained by metallocene catalysis.

5. The flame-retardant electric cable according to claim 1, wherein the low-density polyethylene copolymer has a density ranging from 0.840 to 0.910 g/cm$^3$.

6. The flame-retardant electric cable according to claim 1, wherein the low-density polyethylene copolymer is in an amount greater than 2 wt % of the total weight of the composition.

7. The flame-retardant electric cable according to claim 1, wherein the low-density polyethylene copolymer is in an amount at most 10 wt % of the total weight of the composition.

8. The flame-retardant electric cable according to claim 1, wherein the flame-retardant polyolefin-based composition comprises calcinated kaolin in an amount from 3.5 phr to 13 phr.

9. The flame-retardant electric cable according to claim 1, wherein the flame-retardant polyolefin-based composition comprises metal hydroxide in an amount from 10.5 phr to 45 phr.

10. The flame-retardant electric cable according to claim 1, wherein the metal hydroxide is precipitated magnesium hydroxide.

11. The flame-retardant electric cable according claim 1, wherein the alkyl or alkenyl alkoxy siloxane is selected from compounds having the following general formula I:

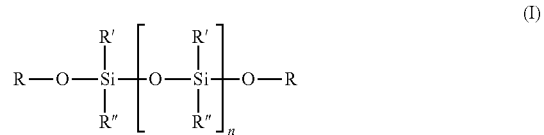

wherein R is hydrogen or a straight or branched alkyl group having from 1 to 4 carbon atoms;
R' and R" are the same or different and are selected from a straight or branched alkyl or alkenyl group having from 5 to 20 carbon atoms; and
n is an integer from 1 to 10,000.

12. The flame-retardant electric cable according claim 11, wherein the alkyl or alkenyl alkoxy siloxane is selected from compounds having the general formula I wherein R is ethoxy and R' and R" are the same or different and selected from a straight or branched alkyl group having from 6 to 16 carbon atoms.

13. The flame-retardant electric cable according claim 1 which is a low voltage cable.

* * * * *